(12) United States Patent
Fan et al.

(10) Patent No.: US 9,866,831 B2
(45) Date of Patent: Jan. 9, 2018

(54) METHOD AND ENCODER SYSTEM FOR ENCODING VIDEO

(71) Applicant: Axis AB, Lund (SE)

(72) Inventors: Xing Danielsson Fan, Lund (SE); Viktor Edpalm, Lund (SE); Fredrik Pihl, Malmö (SE); Lars Persson, Malmö (SE); Alexandre Martins, Malmö (SE)

(73) Assignee: Axis AB, Lund (SE)

( * ) Notice: Subject to any disclaimer, the term of this patent is extended or adjusted under 35 U.S.C. 154(b) by 145 days.

(21) Appl. No.: 14/939,590

(22) Filed: Nov. 12, 2015

(65) Prior Publication Data

US 2016/0142705 A1    May 19, 2016

(30) Foreign Application Priority Data

Nov. 14, 2014 (EP) .................................... 14193291

(51) Int. Cl.
*H04N 7/12* (2006.01)
*H04N 11/02* (2006.01)
(Continued)

(52) U.S. Cl.
CPC ......... *H04N 19/105* (2014.11); *H04N 19/107* (2014.11); *H04N 19/114* (2014.11);
(Continued)

(58) Field of Classification Search
CPC .. H04N 19/105; H04N 19/503; H04N 19/182; H04N 19/179; H04N 19/177;
(Continued)

(56) References Cited

U.S. PATENT DOCUMENTS

2004/0146108 A1    7/2004  Hsia
2007/0025444 A1*   2/2007  Okada ................... H04N 19/52
                                                       375/240.16
(Continued)

FOREIGN PATENT DOCUMENTS

EP    2 536 143 A1    12/2012

OTHER PUBLICATIONS

EP 14 19 3291.3 European Search Report (dated May 7, 2015).
(Continued)

*Primary Examiner* — Tat Chio
(74) *Attorney, Agent, or Firm* — Volpe and Koenig, P.C.

(57) ABSTRACT

A method for encoding video is disclosed. The method comprises the steps of receiving information representative of pixels in a current digital image frame of a video to be encoded, calculating a group value for each group of neighboring pixels based on the received information, accumulating group values of corresponding groups of pixels in a first sequence of frames to form a first accumulation of accumulated group values, accumulating group values of corresponding groups of pixels in a second sequence of frames to form a second accumulation of accumulated group values, wherein the second sequence includes frames captured over a longer period of time than the first sequence, comparing accumulated group values of the first accumulation with accumulated group values of the second accumulation, calculating a global change value based on the comparison, setting a GOP length based on the global change value; and encoding the current image frame as an intra-frame or inter-frame based on the GOP length. An encoder system for encoding video is also disclosed.

14 Claims, 10 Drawing Sheets

(51) Int. Cl.
| | |
|---|---|
| H04N 11/04 | (2006.01) |
| H04N 19/105 | (2014.01) |
| H04N 19/172 | (2014.01) |
| H04N 19/114 | (2014.01) |
| H04N 19/137 | (2014.01) |
| H04N 19/107 | (2014.01) |
| H04N 19/177 | (2014.01) |
| H04N 19/179 | (2014.01) |
| H04N 19/182 | (2014.01) |
| H04N 19/186 | (2014.01) |
| H04N 19/503 | (2014.01) |
| H04N 19/593 | (2014.01) |
| H04N 19/142 | (2014.01) |
| H04N 19/87 | (2014.01) |

(52) U.S. Cl.
CPC ......... *H04N 19/137* (2014.11); *H04N 19/172* (2014.11); *H04N 19/177* (2014.11); *H04N 19/179* (2014.11); *H04N 19/182* (2014.11); *H04N 19/186* (2014.11); *H04N 19/503* (2014.11); *H04N 19/593* (2014.11); *H04N 19/142* (2014.11); *H04N 19/87* (2014.11)

(58) Field of Classification Search
CPC .. H04N 19/107; H04N 19/186; H04N 19/593; H04N 19/172; H04N 19/114; H04N 19/137; H04N 19/142; H04N 19/87
See application file for complete search history.

(56) References Cited

U.S. PATENT DOCUMENTS

| | | | | |
|---|---|---|---|---|
| 2013/0016770 A1* | 1/2013 | Kishigami | ......... | H04N 21/2662 375/240.02 |
| 2014/0072034 A1 | 3/2014 | Tanner et al. | | |
| 2015/0156511 A1* | 6/2015 | Lundberg | ............... | H04N 19/44 375/240.12 |
| 2015/0281705 A1* | 10/2015 | Wang | ................. | H04N 19/1883 375/240.03 |

OTHER PUBLICATIONS

"Scene Transition Based Adaptive GOP Selection for Increasing Coding Efficiency & Resiliency", Midya et al., International Conference on Informatics, Electronics & Vision (ICIEV), IEEE, May 18, 2012.
"Coding Efficiency Improvement with Adaptive GOP Size Selection for H.264/SVC", Matsouka et al., 3rd International Conference on Innovative Computing Information and Control (ICICIC), IEEE, Piscataway, NJ, Jun. 18, 2008.
"Single-pass constant-and variable-bit-rate MPEG-2 video compression", Mohsenian et al., IBM Journal of Research and Development, IBM Corporation, New York, NY, vol. 43., No. 4; Jul. 1, 1999.
"MPEG Encoding Algorithm with Scene Adaptive Dynamic GOP Structure", Yonehama et al., IEEE 3rd Workshop on Multimedia Signal Processing, Copenhagen, Denmark, Sep. 13, 1999.
"Effective Flicker Removal from Periodic Intra Frames and Accurate Flicker Measurement", Yang et al., Image Processing, 2008, ICIP 2008, 15th IEEE International Conference, Oct. 12-15, 2008.
Efficient Intra Refresh Using Motion Affected Region Tracking for Surveillance Video over Error Prone Networks, Jiang et al., Intelligent Systems Design and Applications, 2008; ISDA '08, Eighth International Conference (vol. 2) Nov. 26-28, 2008.

* cited by examiner

| $V_{1,1}$ | $V_{1,2}$ | $V_{1,3}$ |
|---|---|---|
| $V_{2,1}$ | $V_{2,2}$ | $V_{2,3}$ |
| $V_{3,1}$ | $V_{3,2}$ | $V_{3,3}$ |

Fig. 7

| $CL_{1,1}$ | $CL_{1,2}$ | $CL_{1,3}$ |
|---|---|---|
| $CL_{2,1}$ | $CL_{2,2}$ | $CL_{2,3}$ |
| $CL_{3,1}$ | $CL_{3,2}$ | $CL_{3,3}$ |

| $QP_{1,1}$ | $QP_{1,2}$ | $QP_{1,3}$ |
|---|---|---|
| $QP_{2,1}$ | $QP_{2,2}$ | $QP_{2,3}$ |
| $QP_{3,1}$ | $QP_{3,2}$ | $QP_{3,3}$ |

METHOD AND ENCODER SYSTEM FOR ENCODING VIDEO

FIELD OF INVENTION

The present invention relates to the field of digital image compression, and relates particularly to a method for encoding video, and to an encoder system for encoding video.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Further, the encoded frames are arranged in groups of pictures, or GOPs, where each group of pictures is started with an I-frame, and the following frames are P-frames or B-frames. The number of frames in a group of pictures is generally referred to as a GOP length. GOP lengths may vary from 1, meaning that there is just an intra-frame, and no inter-frames, in a group of pictures, to, e.g., 255, meaning that there is one intra-frame followed by 254 inter-frames in a group of pictures. Since intra-frames generally require more bits for representation of an image than inter-frames, motion video having longer GOP lengths will generally produce a lower output bit rate than motion video having shorter GOP lengths.

At the site of reception of the encoded video sequence, the encoded frames are decoded. A concern in network camera monitoring systems is the available bandwidth for transmission of encoded video. This is particularly true in systems employing a large number of cameras. Further, this concern is especially important in situations where available bandwidth is low, such as when the video sequence is to be transmitted to a mobile device, e.g., a mobile phone, a PDA, or a tablet computer. An analogous problem occurs regarding storage of images, for instance when storing images on an on-board SD card in the camera. A compromise has to be made, where available bandwidth or storage is balanced against the interest of high quality video images. A number of methods and systems have been used for controlling the encoding in order to reduce the bit rate of transmissions from the cameras. These known methods and systems generally apply a bit rate limit, and control the encoding such that the output bit rate from the cameras is always below the bit rate limit. In this way, it may be ensured that the available bandwidth is sufficient, such that all cameras in the system may transmit their video sequences to the site of reception, e.g., a control center, where an operator may monitor video from the cameras of the system, and where video may be recorded for later use. However, applying a bit rate limit to all cameras may lead to undesirably low image quality at times, since the bit rate limit may require severe compression of images containing a lot of details, regardless of what is happening in the monitored scene. Generally, images of a scene with motion are of higher interest to an operator than images of a static scene. Still, when applying a bit rate limit, images with motion may need to be heavily compressed in order not to exceed the limit, thereby leading to low image quality. As mentioned above, another way of reducing the output bit rate is to use longer GOP lengths. However, since this implies that the frequency of intra-frames is decreased, errors caused by the predictions employed when encoding the inter-frames may propagate further, leading to annoying encoding artifacts in the displayed image.

SUMMARY

It is an object of the invention to provide a method for encoding video, which makes it possible to reduce output bit rate, while still allowing high quality video images of motion in a captured scene.

According to a first aspect, this object is achieved, in full or at least in part, by a method for encoding video, comprising: receiving information representative of pixels in a current digital image frame of a video to be encoded, calculating a group value for each group of neighboring pixels based on said received information for groups of neighboring pixels in said current digital image frame, accumulating group values of corresponding groups of neighboring pixels in a first sequence of digital image frames comprising said current frame and a first number of preceding image frames to form a first accumulation of accumulated group values, accumulating group values of corresponding groups of neighboring pixels in a second sequence of digital image frames comprising said current digital image frame and a second number of preceding digital image frames to form a second accumulation of accumulated group values, wherein said second sequence of digital image frames includes digital image frames captured over a longer period of time than the image frames of said first sequence, comparing accumulated group values of said first accumulation with accumulated group values of corresponding groups of neighboring pixels in said second accumulation, calculating a global change value based on the comparison of the first and second accumulations of group values, setting a GOP length as a number of frames to be encoded in a group of pictures based on said global change value; and encoding said current image frame as an intra-frame or inter-frame based on said GOP length. With such a method, it may be possible to reduce bit rate when encoding images of a static scene by using less frequent intra-frames, whereas images of a scene with motion may be encoded with more frequent intra-frames, thereby reducing encoding artifacts.

The step of calculating the global change value may comprise calculating a change value for each group of neighboring pixels based on a difference between corresponding accumulated group values of said first and second accumulations. This is may provide a practical and reliable way of calculating the global change value.

In a variant, the method further comprises comparing said global change value to a high threshold value, and if said global change value is above said high threshold value decreasing said GOP length from a current GOP length. In this manner, the GOP length may be adapted, such that a shorter GOP length is used when there is motion in the captured scene.

The high threshold value may correspond to a global change value representing motion of an object of interest in a scene captured in said current image frame.

The method may further comprise comparing said global change value to a low threshold value, and if said global change value is below said low threshold value increasing said GOP length from a current GOP length. In this manner, the GOP length may be adapted, such that a longer GOP length is used when the captured scene is static, thereby reducing the output bit rate.

The low threshold value may correspond to a global change value representing substantially no motion in a scene captured in said current image frame.

In a variant, the method further comprises limiting said GOP length to a predetermined GOP range defined by a maximum allowable GOP length and a minimum allowable GOP length. It may hereby be ensured that the GOP length does not become too long, with an ensuing risk of annoying encoding artifacts, nor too short, leading to an unacceptably high transmitted bit rate.

The method may further comprise comparing said global change value to a global change limit, wherein the global change limit is a threshold that is of a higher value than said high threshold, and if said global change value is above said global change limit, encoding said current image frame as an intra-frame independent of the GOP length. In this way, it may be ensured that the current image frame is encoded as an intra-frame, whereas it would otherwise have to be encoded as an inter-frame, but with many of the macro blocks being encoded in intra mode.

The global change limit may correspond to a global change value representing a substantial scene change in a scene captured in said current image frame. A substantial change may, e.g., be caused by turning the light on or off in a room, by quickly moving clouds, or by objects taking up a large portion of the image moving across the captured scene.

The step of accumulation of group values may comprise adding group values of corresponding groups of pixels in said first sequence of digital image frames and second sequence of digital image frames, respectively.

Each group of neighboring pixels may consist of a number of pixels which is equal to a number of pixels in macro blocks used in the step of encoding. This may make setting of compression values based on the calculation of the global change value and/or the local change value particularly convenient.

According to a second aspect, the abovementioned object is achieved, in full or at least in part, by an encoder system for encoding video comprising: a receiving module arranged to receive information representative of pixels in a current digital image frame of a video to be encoded, a group value module arranged to calculate a group value for each group of neighboring pixels based on said received information for groups of neighboring pixels in said current digital image frame, an accumulation module arranged to accumulate group values of corresponding groups of neighboring pixels in a first sequence of digital image frames comprising said current image frame and a first number of preceding image frames to form a first accumulation of accumulated group values, and arranged to accumulate group values of corresponding groups of neighboring pixels in a second sequence of digital image frames comprising said current image frame and a second number of preceding image frames to form a second accumulation of accumulated group values, said second sequence of digital image frames includes digital image frames captured over a longer period of time than the image frames of said first sequence, a comparing module arranged to compare accumulated group values of said first accumulation with accumulated group values of corresponding groups of neighboring pixels of said second accumulation, a global change value module arranged to calculate a global change value based on the comparison of the first and second accumulations of group values, a GOP length module arranged to set a GOP length as a number of frames to be encoded in a group of pictures based on said global change value; and an encoding module arranged to encode said current image frame as an intra-frame or an inter-frame based on said GOP length. Such an encoder system may enable reduction of bit rate, while still allowing high quality video images of a scene with motion.

The encoder system of the second aspect may generally be embodied in the same ways as the method of the first aspect, with accompanying advantages.

According to a third aspect, the abovementioned object is achieved, in full or at least in part, by a camera comprising an encoder system according to the second aspect.

According to a fourth aspect, the abovementioned object is achieved, in full or at least in part, by a computer program product comprising a computer-readable storage medium with instructions adapted to carry out the method according to the first aspect when executed by a processor. The processor may be any type of device having processing capability, e.g., a central processing unit (CPU), a graphics processing unit (GPU), a custom made processing device implemented in an integrated circuit, an ASIC, an FPGA, or logical circuitry including discrete components.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which:

FIG. 7 is an illustration of group values of groups of pixels arranged in correspondence with the groups of pixels, FIG. 8 is an illustration of accumulations of group values on different time scales, FIG. 9 is an illustration of local change values of groups of pixels arranged in correspondence with the groups of pixels.

DETAILED DESCRIPTION OF THE PREFERRED EMBODIMENTS

Figure 1:
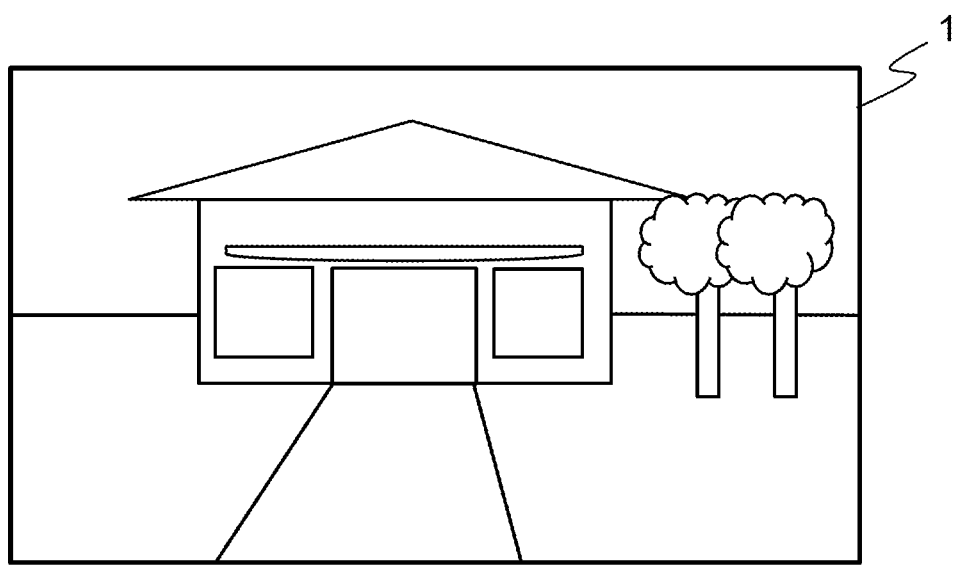
FIG. 1 is a view of a digital image depicting a monitored scene.
Figure 2:
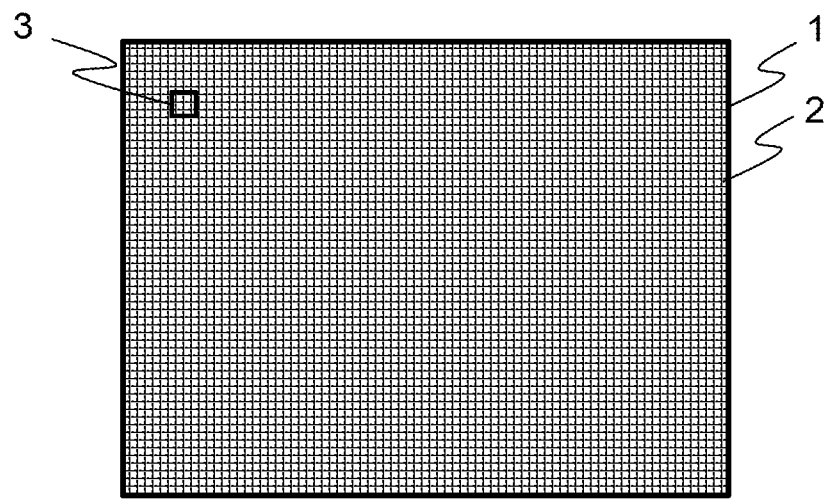
FIG. 2 is an illustration of a principal structure of the image in FIG. 1.
Figure 3:
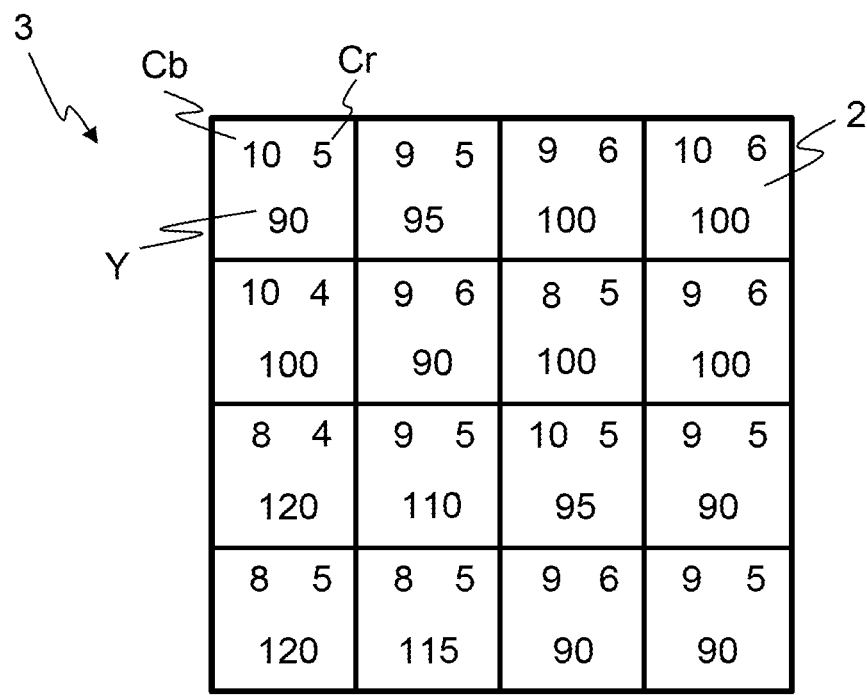
FIG. 3 is a detail view of part of the image in FIG. 2.

In FIG. 1, a digital image 1 is shown, which depicts a monitored scene. The image 1 is made up of a number of pixels 2, such as indicated in the illustration in FIG. 2. For instance, the image 1 may be 1280 pixels wide and 960 pixels high. This image 1 is represented in a YCbCr color space, which means that each pixel 2 has a luminance value Y, a chromaticity blue value Cb, and a chromaticity red value Cr. In FIG. 3, a small part of the image 1, schematically indicated by a box 3 in FIG. 2, is illustrated. This small part of the image 1 is four pixels wide by four pixels high. For each pixel 2 in FIG. 3, a number at the top left corner represents the Cb value, a number at the top right corner represents the Cr value, and a number at the bottom represents the Y value for that pixel.

When the image 1 is to be stored or transmitted to, e.g., a control center, where an operator or a guard may watch displayed images of monitored scenes, the image has to be encoded. In this example, a codec working according to the H.264 compression format is used. When encoding the image 1, parameters such as GOP length and compression value may be controlled in order to control the amount of data required for storing or transmitting the encoded image, i.e. in order to control an output bit rate. In the H.264 compression format, the compression value will be the quantization parameter QP. The image to be encoded is partitioned into independent blocks, called macro blocks or pixel blocks, which are encoded individually. All macro blocks in an image generally have the same size, and may be, e.g., 8×8 pixels, 16×16 pixels, or 32×32 pixels. Different macro blocks in one and the same image may be assigned different compression values. A frame rate at which images are encoded may also be controlled for controlling the output bit rate. Available bandwidth for transmission will generally limit the allowable bit rate. In systems employing a plurality of cameras, and in systems with small bandwidth, such as when transmitting images to a user's mobile phone, the allowable bit rate output from each individual camera may be quite restricted. As already indicated in the background section above, applying a bit rate limit may require severe compression and/or long GOP lengths, resulting in low quality images, possibly with an annoying amount of encoding artifacts.

Figure 4:
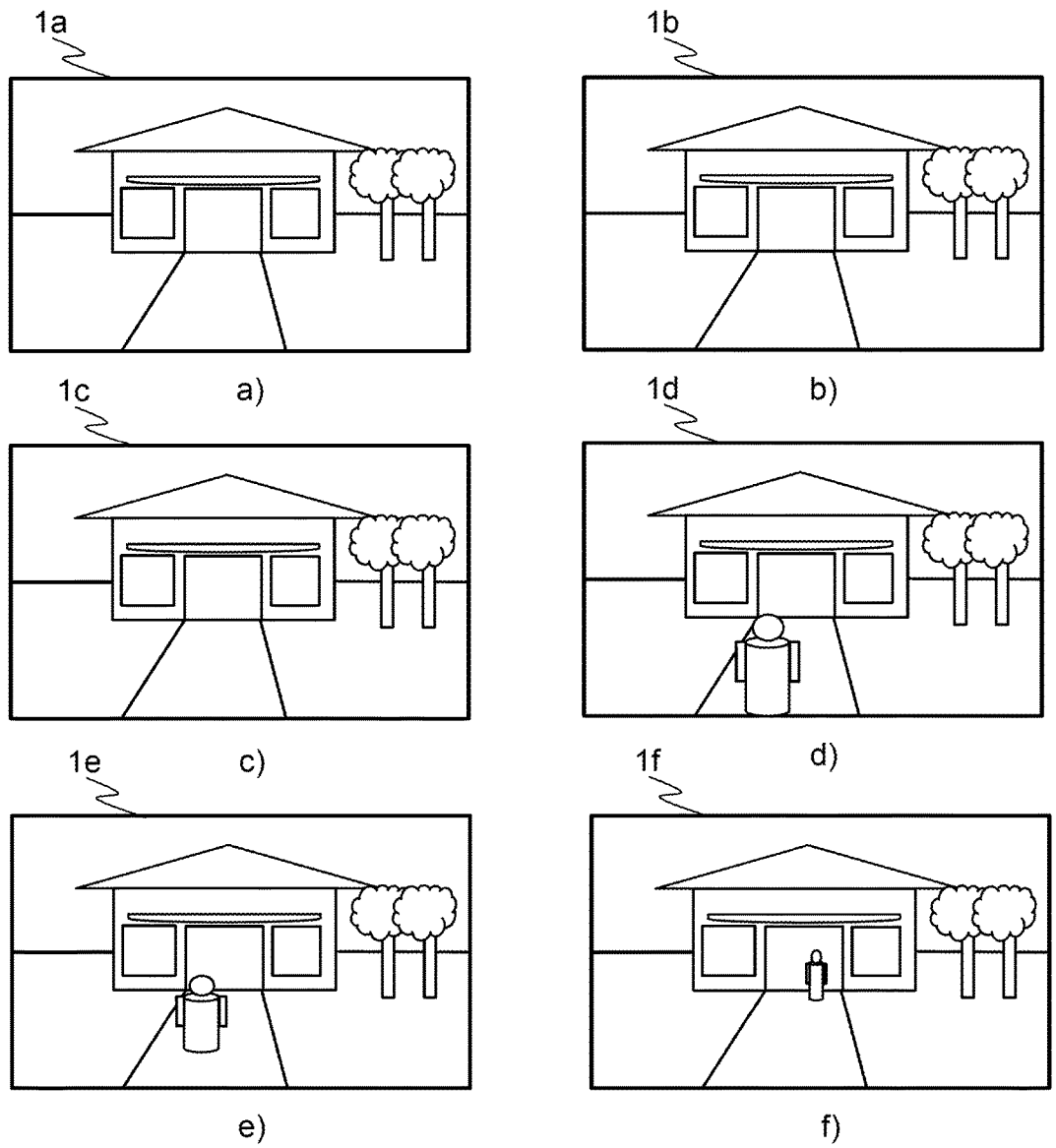
FIG. 4 is an illustration of a video sequence of digital images.

FIG. 4 illustrates a video sequence of six successive image frames 1a-f. As may be seen, the first image 1a depicts a scene with a house, two trees, and a path leading up to the house. The second image 1b shows the same scene with no changes. The third image 1c shows the same, static scene. These three images 1a-c will most likely not be of particular interest to an operator watching displayed images of the monitored scene. The fourth image 1d shows the same scene, but now a person has entered the scene, at the lower edge of the image 1d. In the fifth image 1e, it may be seen that the person has moved along the path, towards the house. The sixth image if shows the person directly in front of the house. These three later images 1d-f will probably be of higher interest to the operator, as they show that something is happening in the monitored scene, and more precisely that a potential intruder is moving towards the house.

Figure 5:
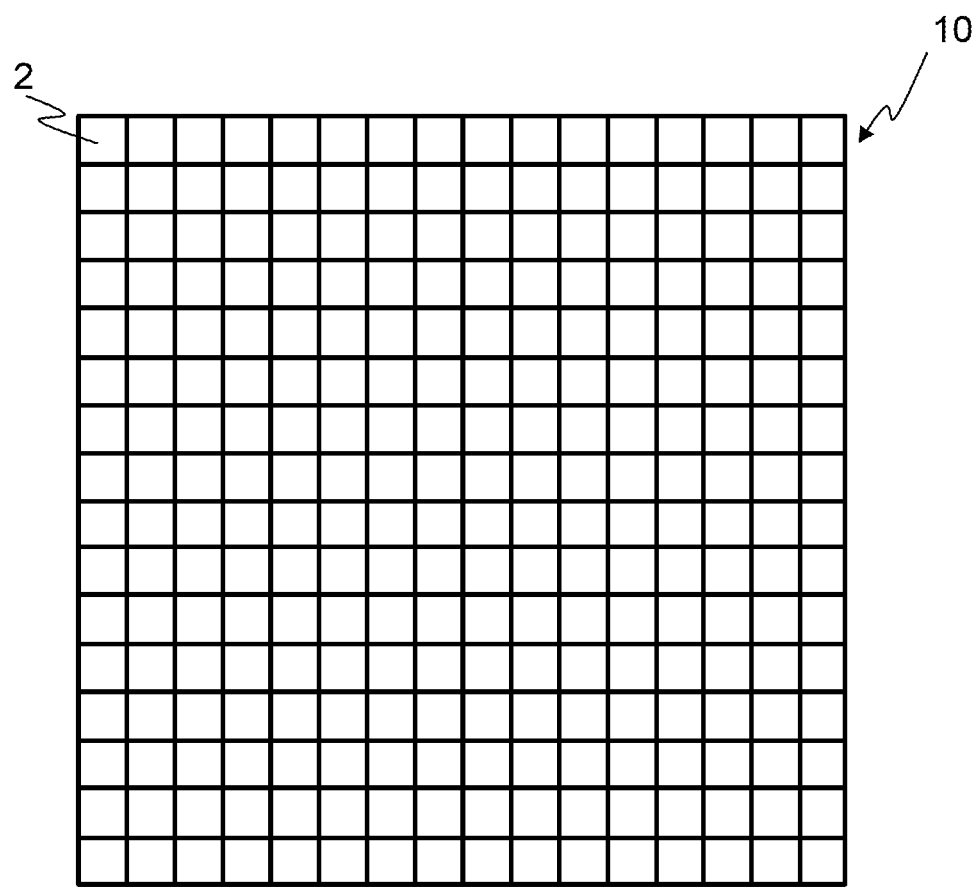
FIG. 5 is an illustration of a group of pixels of the image shown in FIG. 2.
Figure 6:
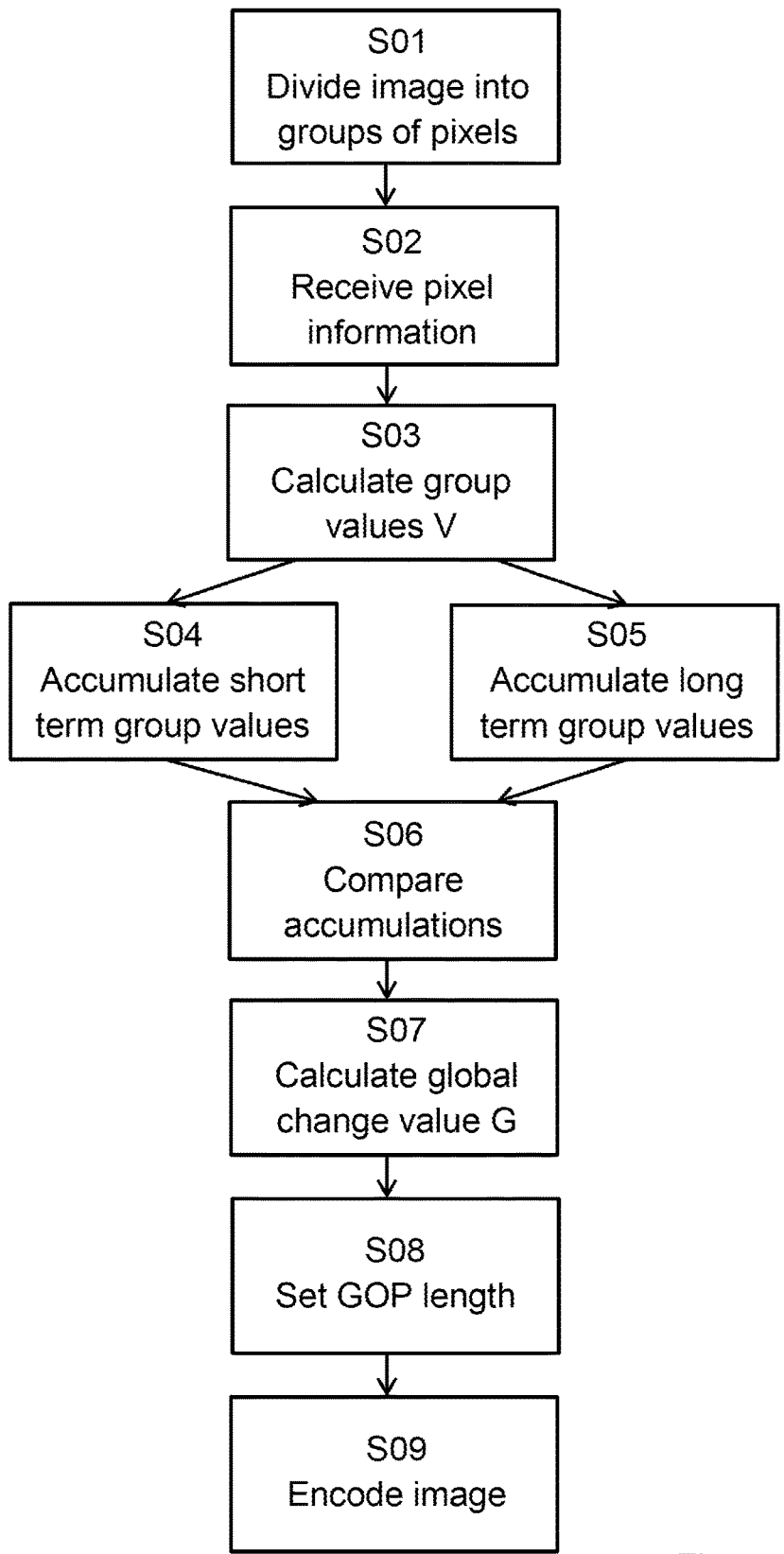
FIG. 6 is a flow chart showing a variant of the inventive method.
Figure 8:
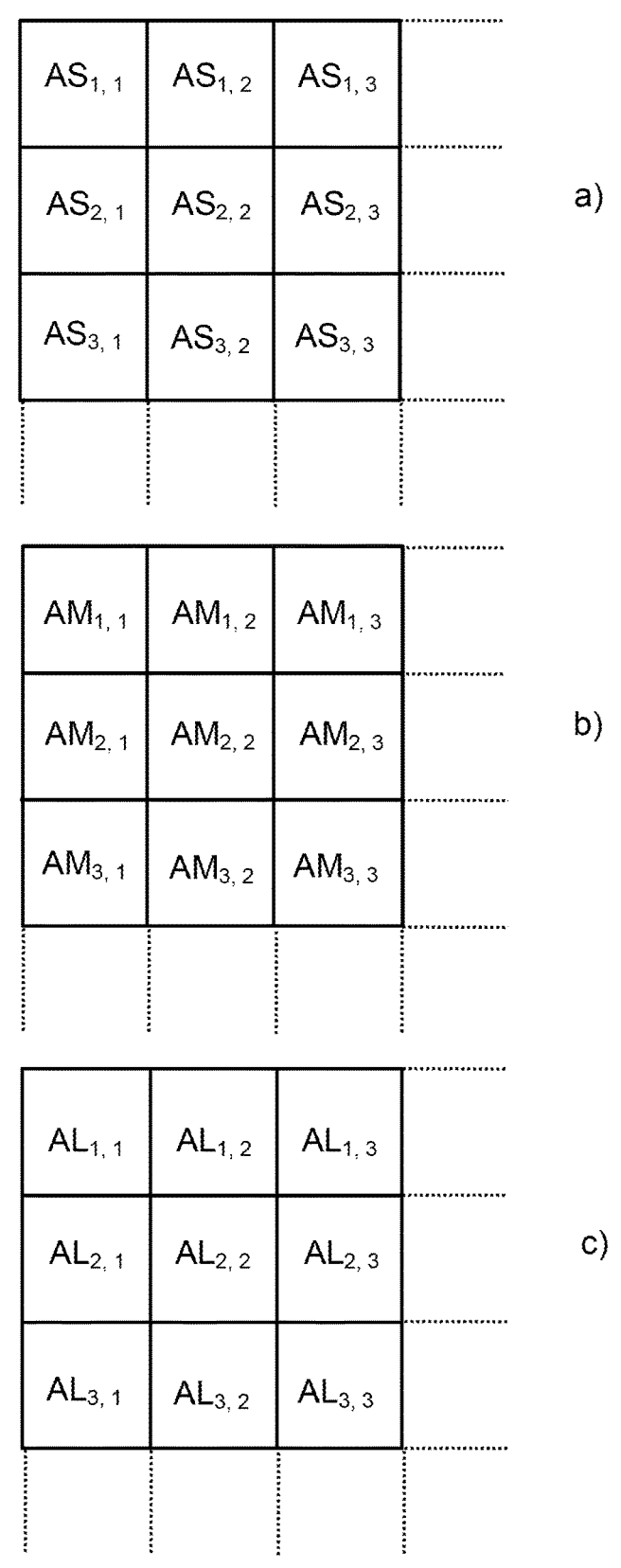

In the following, a variant of the inventive method will be described in closer detail with reference to FIGS. 2-9. Starting with the first image 1a in FIG. 4, this image is divided into groups of pixels (step S01 in FIG. 6). These groups of pixels may or may not correspond to the macro blocks used in encoding. In this example, the image 1a is divided into groups of 16×16 pixels, i.e. 256 pixels. One such group 10 is shown in FIG. 5. For each pixel 2 in the group 10 information representative of the pixel 2 is received (step S02). In this example, the representative information is the luminance Y. A sum of the luminance values of all pixels 2 in the group 10 is calculated to form a group value V (step S03), in accordance with the following formula:

$$V = \sum_{n=1}^{N} Y_n$$

Here, $Y_n$ is the luminance value of the n:th pixel and N is the total number of pixels in the group 10. Thus, in this example N=256. The sum of the luminance values is just one of many possible statistical measures that may be used for calculating the group value V. Other ways of calculating the group value V is to calculate statistical measures such as a mean, a median, an interquartile range, a standard deviation, a variance, a skewness, or a kurtosis of the luminance values of the pixels of the group.

In the same manner, a group value is calculated for each group of pixels in the image 1a. In the example image 1a, there are 80×60 groups, i.e. 4800 groups.

The calculated group values V may be arranged in a matrix corresponding to the positions of the groups of pixels in the image, forming a map as indicated in FIG. 7. Here, $V_{R,C}$ indicates the group value of a group of pixels on row R, column C in the map.

The group values are accumulated over a number of successive images. A first accumulation, which may be referred to as a short term accumulation AS, is formed by adding group values of a number of images captured over a short time (step S04). This may be done using the principle of an infinite impulse response filter, according to the following formula:

$$AS_m = (1-\alpha) \cdot AS_{m-1} + \alpha \cdot V_m$$

Here, m is the number of the current image frame in the video sequence, $AS_{m-1}$ is the accumulation for the preceding image frames, and α is a weighting factor. The weighting factor α is chosen depending on the length of time desired for the accumulation. In this example, the short term accumulation is formed by weighting in the group values of the current image frame with a weight a of 0.25, thus essentially accumulating group values of the current image frame and three preceding image frames. The short term accumulated group values may be stored in a matrix or map as shown in FIG. 8a in correspondence with the positions of the groups of pixels in the image. Here, $AS_{R, C}$ signifies the short term accumulated group value of the group of pixels in row R, column C in the map.

Additionally, a second accumulation, which may be referred to as a long term accumulation AL, is formed by adding group values of a number of image frames captured over a longer period of time (step S05). Similar to what has been described for the short term accumulation, the following formula may be used:

$$AL_m = (1-\beta) \cdot AL_{m-1} + \beta \cdot V_m$$

In the same way as described above, m is the number of the current image frame in the video sequence, $AL_{m-1}$ is the accumulation for the preceding image frames, and β is a weighting factor. In this example, the group values of the current image frames are weighted in using a weighting factor β of 0.01. Thus, the long term accumulation AL is formed essentially by adding the group values of the current image frame and 99 preceding image frames. In the same way as for the short term accumulation AS, the long term accumulated group values may be stored in a matrix or map as shown in FIG. 8c in correspondence with the positions of the groups of pixels in the image. In this map, $AL_{R, C}$ signifies the long term accumulated group value of the group of pixels in row R, column C.

The respective accumulations may need to be reset or restarted when there is significant change in the scene. Thus, the accumulations may be reset based on an external trigger, such as when a PTZ camera moves or when a new stream of video is to be encoded. Further, the accumulations may be reset based on a global change value CG, which will be discussed in the following.

Next, the accumulated group values $AS_{R, C}$ of the short term accumulation AS are compared to the corresponding long term accumulated group values $AL_{R, C}$ of the long term accumulation AL (step S06). Based on this comparison, a global change value CG is calculated, which indicates if the current image frame differs from the preceding image frames. The global change value CG may indicate motion in the monitored scene, or other changes, such as lighting changes or moving shadows.

The global change value CG may be calculated by calculating a difference between the short term accumulated group values of the short term accumulation AS and the corresponding long term accumulated group values of the long term accumulation AL. For each group of pixels, the calculated accumulated group value difference is compared to a threshold value $T_N$, which may be noise level based. This difference forms a local change value CL for each group of neighboring pixels. If the difference between short term and long term accumulated group values of a group of pixels is larger than the noise based threshold value $T_N$, the group of pixels is considered to have changed, and the local change value CL of that group of pixels is set to 1. Conversely, if the difference is smaller than the noise level based threshold value $T_N$, the group of pixels is deemed not to have changed, and the local change value CL is set to 0. A finer scale of local change values may also be used, e.g., ranging from 0 to 10. The local change values may be arranged in a matrix or map as shown in FIG. 9, where $CL_{R, C}$ signifies the local change value of the group of pixels in row R, column C.

The global change value CG is then calculated (step S08) by calculating an average of the local change values of all groups of pixels in the image 1a. Thus, for a 16×16 group of pixels, the minimum global change value is 0, meaning that none of the pixels have changed more than the noise level based threshold value $T_N$. The maximum global change value is 256, meaning that all pixels have changed more than the noise level based threshold value $T_N$.

The global change value CG is compared to a high threshold value $T_H$. The high threshold value $T_H$ is set such that if the global change value CG is above the high threshold value $T_H$, the change in the image represents movement of an interesting object in the monitored scene. Thus, depending on the purpose of the monitoring, and thereby the type of objects that are interesting, the high threshold value $T_H$ may be set to different values.

If the global change value CG is not above the high threshold value $T_H$, the global change value CG is compared to a low threshold value $T_L$. The low threshold value $T_L$ is set such that if the global change value CG is below the low threshold value $T_L$, the change in the image represents substantially no motion in the monitored scene. Depending on the scene and the purpose of the monitoring, no motion may mean that the scene is completely static, such as an indoor scene with no moving objects and constant lighting, or it may mean that only non-interesting objects are moving, such as swaying trees or flag poles or small objects, e.g., rabbits.

If the global change value CG is above the high threshold value $T_H$, the global change value CG is also compared to a global change limit $L_C$ which is a threshold that is of a higher value than the high threshold value $T_H$. The global change limit $L_C$ is set such that if the global change value CG is above the global change limit $L_C$ the change in the image represents a substantial scene change in the captured scene. A substantial change may be a change of lighting, such as when the light is turned on or off in a room, or an object passing before the camera *blocking* most, or all, of the camera's field of view, e.g., a bird flying past close to the camera, or a truck driving across the monitored scene. A substantial change may also be caused by movement of the camera, such as a panning movement of a PTZ camera. As mentioned above, when it has been determined that the global change value CG is above the global change limit, the accumulations of group values may be reset.

The global change value CG is used for setting the GOP length (step S08), i.e. the number of image frames encoded in each group of pictures. When encoding is started, an initial GOP length is set. This may be set as a default value, or may be set by user input. For instance, an initial GOP length of 120 frames may be set. When an image, such as the first image frame 1a in FIG. 3a, is to be encoded, the global change value CG is calculated for that image frame 1a and compared to the high threshold value $T_H$. If the global change value CG is above the high threshold $T_H$, the GOP length is decreased, such that the number of inter-frames succeeding each intra-frame in the encoded video sequence is reduced. Thereby, errors arising from predictions when encoding the inter-frames are not propagated as far along the video sequence as if a longer GOP length is used, thus possibly reducing encoding artifacts. The ensuing increase in output bit rate will generally be acceptable, since it is balanced against the interest of high quality images of the scene when there is motion.

If, on the other hand, the global change value CG is below the low threshold value $T_L$, the GOP length is increased, i.e. the number of inter-frames succeeding each intra-frame in the encoded video sequence is increased. Even though the longer GOP length may result in more encoding artifacts, this risk is to some extent reduced by the low level of motion, and additionally, more artifacts are generally acceptable in images depicting a static scene, since such a scene is of little interest to the operator, anyway. In this manner, the output bit rate is reduced.

In this example, the GOP length is decreased quickly if the global change value CG is above the high threshold value $T_H$, e.g., immediately decreasing the GOP length to 60 frames per group of pictures. Increase of the GOP length may be done more slowly, e.g., increasing the GOP length by 10 frames for each image frame having a global change value CG below the low threshold value $T_L$.

If the global change value CG is somewhere between the low threshold value $T_L$ and the high threshold value $T_H$, the GOP length is left unaltered.

If the global change value CG is above the global change limit $L_C$, the current image frame 1a is encoded as an intra-frame, regardless of the previously used GOP length. Since the global change limit implies that the scene has changed significantly, encoding the image frame 1a as an inter-frame would imply that many macro blocks would need to be encoded in intra-mode. When an intra-frame has been inserted in the encoded video sequence in this way, the GOP length is then returned to the initial or default GOP length, e.g., 120 frames.

The GOP length set based on the global change value CG is used for determining if the current image frame 1a is to be encoded as an intra-frame or an inter-frame. If the current group of pictures is not finished, and the new GOP length does not result in starting a new group of pictures, the current image frame 1a is encoded as an inter-frame. If the previous image frame was the last one in a group of pictures, or if the new GOP length means that a new group of pictures is started, the current image frame 1a is encoded as an intra-frame. If the global change value CG is above the global change limit, the current image frame 1a is encoded as an intra-frame, even though the current group of pictures is not yet finished, i.e. the current image frame 1a is encoded as a forced intra-frame. Once it has thus been determined which encoding mode, intra mode or inter mode, is to be used, the current image frame 1a is encoded (step S09).

A permissible GOP length range is used, such that the GOP length is not allowed to be set below a minimum allowable GOP length or above a maximum allowable GOP length. Thus, if a current GOP length is equal to the minimum allowable GOP length, and the global change value calculated for the current image frame would result in decreasing the GOP length, the GOP length is maintained unchanged. Similarly, if the current GOP length is equal to the maximum allowable GOP length, and the global change value calculated for the current image frame would result in increasing the GOP length, the GOP length is kept at its current value. The allowable GOP length range may be based on a noise level and a frame rate of the video, and may, e.g., be set to 60-600 frames. The allowable GOP length may be preset as a default value or it may be set by user input. Further, it may be controlled based on the frame rate at which images are encoded, and set, e.g., such that each group of pictures is 1-10 seconds long, thus corresponding to a GOP length range of 30-300 frames at 30 fps and to 60-600 frames at 60 fps.

The encoding method then proceeds in the same manner for the following image frames 1b-f (FIG. 3). As mentioned above, the second frame 1b and the third frame 1c depict a static scene. Thus, the global change value CG calculated for the second and third frames 1b, 1c will imply that the GOP length is to be increased for each of these frames. Assuming that the first image frame 1a was not the last in a group of pictures, the second and third image frames will therefore most likely be encoded as inter-frames. However, in the fourth image frame 1d, a person has appeared in the scene, and providing that the high threshold value $T_H$ has been set such that it represents a global change value caused by moving people, the global change value CG calculated for the fourth image frame 1d will imply that the GOP length is to be decreased. Similarly, the global change value CG of the fifth image frame 1e and the sixth image frame 1f will also imply that the GOP length is to be decreased. Depending on if the current group of pictures is finished or not, the fourth, fifth and sixth image frames 1d-f will be encoded as inter-frames or intra-frames.

Figure 10:
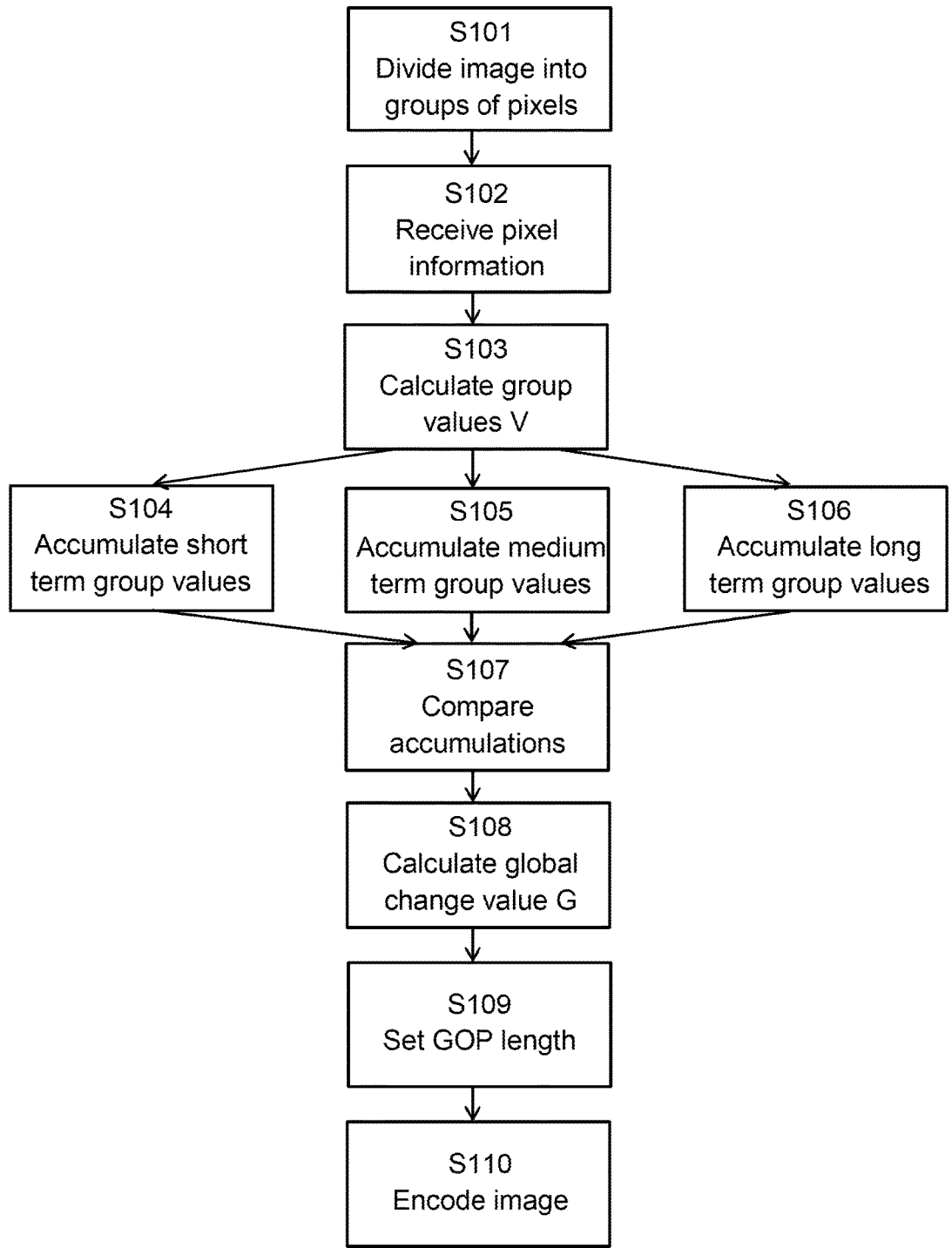
FIG. 10 is a flow chart showing another variant of the inventive method.

With reference to FIG. 10, another variant of the inventive method will now be described. Most of the steps of this variant are identical to the ones described above, and they will therefore not be described in detail here. The differing steps will be described in closer detail. In the same way as described above in relation to FIG. 6, a current image frame, such as the first image frame 1a in FIG. 4a, is divided into groups of pixels (step S101). Information representative of the pixels in the current image frame is received (step S102). Here, also, the representative information is the luminance. For each group of pixels a group value is calculated as the sum of the luminance values (step S103). The group values V are accumulated in a first accumulation or short term accumulation AS (S104) and in a second accumulation or long term accumulation AL (S106), in the same way as was described above in connection with FIG. 6. Different from the previously described variant of the method, the group values are also accumulated in a third accumulation or medium term accumulation AM (step S105). The following formula is used:

$$AM_m = (1-\gamma) \cdot AM_{m-1} + \gamma \cdot V_m$$

Similar to the short term and long term accumulations, m is here the number of the current image frame in the video sequence, $AM_{m-1}$ is the accumulation for the preceding image frames, and $\gamma$ is a weighting factor. In this example, a weighting factor $\gamma$ of 0.1 is used. Thus, the medium term accumulation AM is essentially formed by adding the group values of the current image frame and nine preceding image frames. Similar to the short term accumulated group values $AS_{R,C}$ and the long term accumulated group values $AL_{R,C}$, the medium term accumulated group values $AM_{R,C}$ may be arranged in a matrix or map as indicated in FIG. 8b.

The accumulations are compared (step S107), but in a slightly different way than described above. First, the accumulated group values of the long term accumulation AL are compared to the accumulated group values of the medium term accumulation AM. Groups of pixels having a difference between the long term accumulated group value and the medium term accumulated group value which is larger than the noise level based threshold $T_N$, are considered candidates for having changed. For these groups of pixels, a further comparison is made between the accumulated group values of the medium term accumulation AM and the accumulated group values of the short term accumulation AS. If these accumulated group values differ by more than the noise level based threshold value $T_N$, the corresponding group of pixels is considered to have changed, and a local change value of that group of pixels is assigned the local change value 1. Otherwise, a local change value of 0 is assigned. As discussed above, a global change value CG is calculated by adding all local change values CL of the groups of pixels in the current image frame (step S108).

The use of the medium term accumulation AM in addition to the short term accumulation AS and the long term accumulation AL may be beneficial in cases such as when there is a big change in the scene, and the scene then returns to a static state. The medium term accumulation AM will in such case return more quickly to a steady state value than the long term accumulation AL. Additionally, the medium term accumulation AM may make the method more reliable at low frame rates.

In the same way as described above, the GOP length is set based on the global change value (step S109), i.e. by comparing the global change value CG to the high threshold value $T_H$, to the low threshold value $T_L$, and to the global change limit $L_C$. The current image frame $1a$ is then encoded (step S110) as an intra-frame or inter-frame, depending on the calculated GOP length and the position in the current group of pictures. If the global change value CG is above the global change limit $L_C$, the current image frame is encoded as an intra-frame, regardless of the position in the current group of pictures. The same procedure is used for encoding the subsequent image frames $1b-f$.

According to another variant of the inventive method, a frame rate at which image frames are encoded is used for determining which comparisons of accumulated group values to use. The frame rate may be set by user input, or may be set based on, e.g., the global change value. If the frame rate is about 5-60 fps, the accumulated group values of the short term accumulation AS and the medium term accumulation AM may be compared for determining the global change value CG. If the frame rate is low, e.g., less than 5 fps, the accumulated group values of the medium term accumulation AM and the long term accumulation AL may be compared in order to determine the global change value CG. At very low frame rates, e.g., less than 0.1 fps, the image may be considered to contain no motion, and the global change value may therefore be assumed to be below the low threshold value $T_L$, such that the GOP length is increased, even without having to make any comparison between accumulated group values.

The local change values CL calculated for an image frame may, in addition to being used for calculating a global change value, be utilized for setting compression values for each macro block to be encoded. In this example, the compression value is the quantization parameter QP used in the H.264 compression format.

When encoding is to be started, initial compression values QP are set for all macro blocks of a first image frame. As discussed above, the macro blocks may be identical to the groups of pixels used for calculating group values V. Alternatively, each macro block may be a subgroup of a group of pixels used for calculating group values. Unless the compression values QP are altered, the initial compression values QP will be used for all subsequent images. However, it may be beneficial to modify the compression values QP based on the local change values, such that compression of an image frame is adapted to changes in the monitored scene. Thus, parts of the image frame that are static may be more severely compressed, whereas parts of the image depicting motion may be less compressed, thereby providing higher quality images of parts of the monitored scene that are in motion. In this manner, an overall output bit rate may be reduced, while still allowing high quality images of interesting parts of the monitored scene. The lowered bit rate may also prevent frame drops that may be caused by overloading the encoder system.

Figures 12, 13:
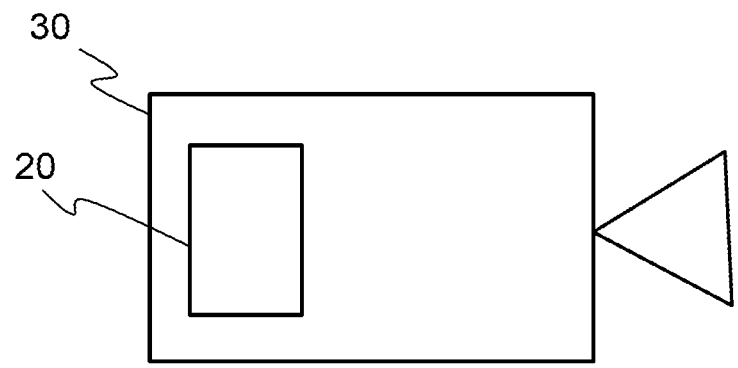
FIG. 12 shows a camera with an integrated encoder system.
FIG. 13 is an illustration of compression values of groups of pixels arranged in correspondence with the groups of pixels.

For each group of neighboring pixels in the current image frame, a local change value CL is calculated as described above. For each macro block a compression value QP is calculated. If the macro blocks are identical to the groups of pixels, the local change value of the corresponding group of pixels is used. If each group of pixels contains more than one macro block, e.g., if the groups of pixels each are 32×32 pixels and the macro blocks are 16×16 pixels, the local change value of the group of pixels in which the respective macro block is comprised is used. For each macro block, the compression value QP is calculated as a function of the local change value CL. An exponential relationship may be used, such that if the local change value CL is expressed on an exponential scale, the compression value QP is calculated as a linear function of the local change value CL, and if the local change value CL is expressed on a linear scale, the compression value QP is calculated as an exponential function of the local change value CL. Instead of setting compression values QP, changes in compression value ΔQP may be set. For instance, an initial compression value, e.g., QP=28 may be set for all macro blocks. Based on the local change values, changes from this initial or default compression value may be set for each macro block using the same principle as described above. The calculated compression values QP or the changes ΔQP may be arranged in a matrix or map as indicated in FIG. 13.

Before encoding, the image frames may be processed in a transformation module, e.g., a hardware accelerated transformation module, which may sometimes be referred to as a scaler, where an operation such as rotation, cropping, addition of privacy mask, or electronic image stabilization may be performed. The local change values CL may be processed in the same scaler before calculation of the compression values QP in order to provide compression values QP for the correctly corresponding macro blocks. Alternatively, the calculated compression values QP may be processed in the scaler to achieve the same result.

Figure 11:
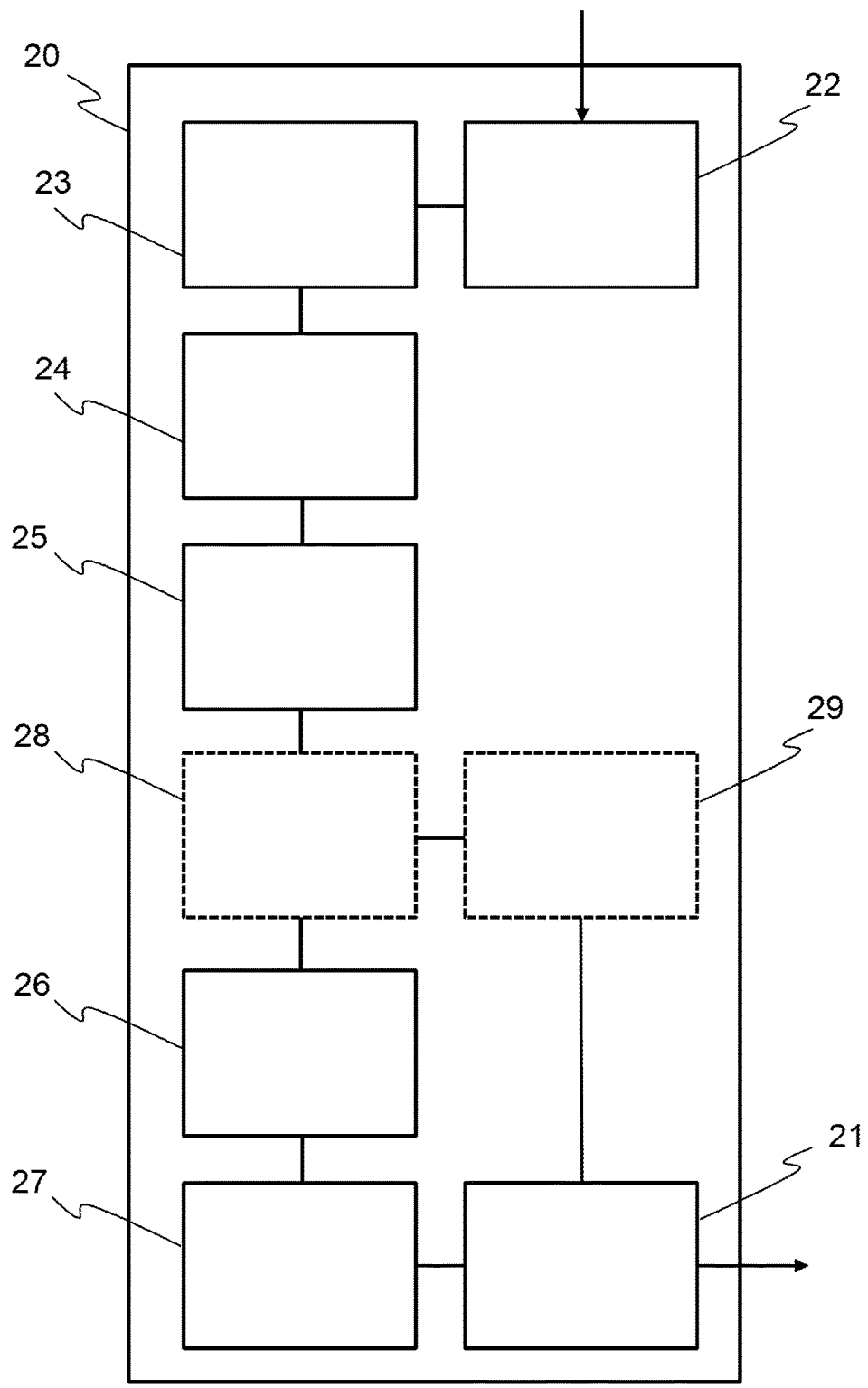
FIG. 11 is a representation of an encoder system according to an embodiment.

In FIG. 11, an embodiment of an encoder system 20 is shown. This encoder system may be used in accordance with the methods described in the foregoing. The encoder system has an encoder module 21 which is arranged to process input image frames using a compression format employing a group of pictures or GOP structure, and using compression values. Further, the encoder system 20 has a receiving module 22 arranged to receive information representative of pixels in images, such as the image frames $1a-f$, and a group value module 23 arranged to calculate a group value for each group of neighboring pixels based on the received information for groups of neighboring pixels in each image frame to be encoded. The encoder system 20 also has an accumulation module 24 which is arranged to accumulate group values of corresponding groups of neighboring pixels in a first sequence of image frames on a short term basis to form a first accumulation or short term accumulation, and to accumulate group values of corresponding groups of neighboring pixels in a second sequence of image frames on a long term basis to form a second accumulation or long term accumulation. The second sequence of image frames includes image frames captured over a longer period of time than the image frames of the first sequence. Still further, the encoder system 20 has a comparing module 25 arranged to compare accumulated group values of the first and second accumulations. A global change value module 26 of the encoder system 20 is arranged to calculate a global change value for each image frame based on the comparison of the accumulated group values of the first and second accumulations. Additionally, the encoder system 20 has a GOP length module 27 arranged to set a GOP length as a number of frames to be encoded in a group of pictures based on the global change value.

Optionally, the encoder system 20 may have a local change value module 28 arranged to calculate a local change value for each group of neighboring pixels in image frames based on a difference between corresponding accumulated group values of the first and second accumulations, and a compression value module 29 arranged to set compression values of macro blocks in the image frames to be encoded based on the local change values.

The encoder system 20 may be embodied as software, firmware, or hardware, or as a combination thereof.

Further, the encoder system 20 may be integrated in a camera 30, as indicated in FIG. 10. Alternatively, the encoder system 20 may be separate from and operatively connected to a camera. The camera 30 may, e.g., be a digital monitoring camera.

It will be appreciated that a person skilled in the art can modify the above described embodiments in many ways and still use the advantages of the invention as shown in the embodiments above. As an example, in the description above, the invention has been described in connection with a H.264 codec. However, it may as well be used with any other block based hybrid codec using a group of pictures structure, e.g., a H.265, MPEG-4 Part 2, or VP9 codec.

In the examples above, the luminance Y of the pixels is used for calculating the group values. However, one of the chromaticity values Cb and Cr could be used instead.

Further, although the invention has been described with reference to images represented in the YCbCr color space, other color spaces may be used instead, for instance RGB or CMY, where one of the color channels may be used for calculating group values. It should also be noted that image data directly from the image sensor, before Bayer filtering, could be used. Here, the image is represented as one grey level per pixel, and these may be used for calculating group values. The grey levels may also be seen as light intensity values.

It should thus be understood that the pixel information may be received from any stage of the image pipeline or video pipeline, and that the particular type of information will depend on wherefrom in the pipeline the information is derived.

Instead of calculating the group value as a sum, other spatial statistical measures may be used, such as, a mean, a median, an interquartile range, a standard deviation, a variance, a skewness or a kurtosis of the information representative of the pixels.

Other time spans may be used for the accumulations. For instance, the short term accumulation may be formed by weighting in group values using a weighting factor $\alpha$ of $\frac{1}{4}$ to 1. The medium term accumulation may be formed by weighting in group values using a weighting factor $\gamma$ of $\frac{1}{15}$ to $\frac{1}{5}$. The long term accumulation may be formed by weighting in group values using a weighting factor $\beta$ of $\frac{1}{150}$ to $\frac{1}{50}$.

The accumulations need not necessarily include all image frames captured over the chosen time span. For instance, every second captured image frame may be used in an accumulation.

If the local change values CL are not to be used for setting the compression values used in encoding, the global change value CG may be calculated without first calculating the local change values. This may be done by using a global motion vector calculated by a codec used for the encoding, by temporal filtering or by using a video motion detection algorithm.

The inventive method and encoder system may be used in connection with any type of camera, e.g., a camera employing visual light, an IR camera, or a thermal camera.

Further, although the invention has been discussed in connection with digital cameras, it may also be used with analog cameras. In such case, images from an analog camera may be converted to digital format using a digitalization unit.

The digital images may also be generated by a visual light sensor, a thermal sensor, a time-of-flight sensor, or other types of image generating sensors capable of generating information representative of pixels to be encoded using intra-frame and inter-frame encoding technologies.

For ease of description, pixel information, group values, accumulated group values and compression values have been described in the form of matrices. However, all such data may be stored in other forms.

Thus, the invention should not be limited to the shown embodiments but should only be defined by the appended claims.

What is claimed is:

1. A method for encoding video comprising:
   receiving information representative of pixels in a current digital image frame of a video to be encoded;
   calculating a group value for each group of neighboring pixels based on said received information for groups of neighboring pixels in said current digital image frame;
   accumulating group values of corresponding groups of neighboring pixels in a first sequence of digital image frames comprising said current frame and a first number of preceding image frames to form a first accumulation of accumulated group values;
   accumulating group values of corresponding groups of neighboring pixels in a second sequence of digital image frames comprising said current digital image frame and a second number of preceding digital image frames to form a second accumulation of accumulated group values, wherein said second sequence of digital image frames includes digital image frames captured over a longer period of time than the image frames of said first sequence;
   comparing accumulated group values of said first accumulation with accumulated group values of corresponding groups of neighboring pixels in said second accumulation;
   calculating a global change value based on the comparison of the first and second accumulations of group values;
   setting a GOP length as a number of frames to be encoded in a group of pictures based on said global change value, including making a choice between increasing, decreasing, and leaving unaltered a current GOP length; and
   encoding said current image frame as an intra-frame or inter-frame based on said GOP length.

2. The method according to claim 1, wherein calculating the global change value comprises calculating a change value for each group of neighboring pixels based on a difference between corresponding accumulated group values of said first and second accumulations.

3. The method according to claim 1, further comprising:
comparing said global change value to a high threshold value; and
if said global change value is above said high threshold value, decreasing said GOP length from a current GOP length.

4. The method according to claim 3, wherein said high threshold value corresponds to a global change value representing motion of an object of interest in a scene captured in said current image frame.

5. The method according to claim 1, further comprising:
comparing said global change value to a low threshold value; and
if said global change value is below said low threshold value, increasing said GOP length from a current GOP length.

6. The method according to claim 5, wherein said low threshold value corresponds to a global change value representing substantially no motion in a scene captured in said current image frame.

7. The method according to claim 1, further comprising:
limiting said GOP length to a predetermined GOP range defined by a maximum allowable GOP length and a minimum allowable GOP length.

8. The method according to claim 1, further comprising:
comparing said global change value to a high threshold value;
if said global change value is above said high threshold value, decreasing said GOP length from a current GOP length;
comparing said global change value to a global change limit, wherein the global change limit is a threshold that is of a higher value than said high threshold; and
if said global change value is above said global change limit, encoding said current image frame as an intra-frame independent of the GOP length.

9. The method according to claim 8, wherein said global change limit corresponds to a global change value representing a substantial scene change in a scene captured in said current image frame.

10. The method according to claim 1, wherein said accumulation of group values comprises adding group values of corresponding groups of pixels in said first sequence of digital image frames and second sequence of digital image frames, respectively.

11. The method according to claim 1, wherein each group of neighboring pixels consists of a number of pixels which is equal to a number of pixels in macro blocks used in the step of encoding.

12. An encoder system for encoding video comprising:
a receiving module arranged to receive information representative of pixels in a current digital image frame of a video to be encoded;
a group value module arranged to calculate a group value for each group of neighboring pixels based on said received information for groups of neighboring pixels in said current digital image frame;
an accumulation module arranged to accumulate group values of corresponding groups of neighboring pixels in a first sequence of digital image frames comprising said current image frame and a first number of preceding image frames to form a first accumulation of accumulated group values, and arranged to accumulate group values of corresponding groups of neighboring pixels in a second sequence of digital image frames comprising said current image frame and a second number of preceding image frames to form a second accumulation of accumulated group values, said second sequence of digital image frames includes digital image frames captured over a longer period of time than the image frames of said first sequence;
a comparing module arranged to compare accumulated group values of said first accumulation with accumulated group values of corresponding groups of neighboring pixels of said second accumulation;
a global change value module arranged to calculate a global change value based on the comparison of the first and second accumulations of group values;
a GOP length module arranged to set a GOP length as a number of frames to be encoded in a group of pictures based on said global change value, including making a choice between increasing, decreasing, and leaving unaltered a current GOP length; and
an encoding module arranged to encode said current image frame as an intra-frame or an inter-frame based on said GOP length.

13. A camera comprising an encoder system, the encoder system comprising:
a receiving module arranged to receive information representative of pixels in a current digital image frame of a video to be encoded;
a group value module arranged to calculate a group value for each group of neighboring pixels based on said received information for groups of neighboring pixels in said current digital image frame;
an accumulation module arranged to accumulate group values of corresponding groups of neighboring pixels in a first sequence of digital image frames comprising said current image frame and a first number of preceding image frames to form a first accumulation of accumulated group values, and arranged to accumulate group values of corresponding groups of neighboring pixels in a second sequence of digital image frames comprising said current image frame and a second number of preceding image frames to form a second accumulation of accumulated group values, said second sequence of digital image frames includes digital image frames captured over a longer period of time than the image frames of said first sequence;
a comparing module arranged to compare accumulated group values of said first accumulation with accumulated group values of corresponding groups of neighboring pixels of said second accumulation;
a global change value module arranged to calculate a global change value based on the comparison of the first and second accumulations of group values;
a GOP length module arranged to set a GOP length as a number of frames to be encoded in a group of pictures based on said global change value, including making a choice between increasing, decreasing, and leaving unaltered a current GOP length; and
an encoding module arranged to encode said current image frame as an intra-frame or an inter-frame based on said GOP length.

14. An article of manufacture including a computer-readable non-transitory storage medium having instructions stored thereon, execution of which by a computing device causes the computing device to perform operations comprising:
receiving information representative of pixels in a current digital image frame of a video to be encoded;
calculating a group value for each group of neighboring pixels based on said received information for groups of neighboring pixels in said current digital image frame;

accumulating group values of corresponding groups of neighboring pixels in a first sequence of digital image frames comprising said current frame and a first number of preceding image frames to form a first accumulation of accumulated group values;

accumulating group values of corresponding groups of neighboring pixels in a second sequence of digital image frames comprising said current digital image frame and a second number of preceding digital image frames to form a second accumulation of accumulated group values, wherein said second sequence of digital image frames includes digital image frames captured over a longer period of time than the image frames of said first sequence;

comparing accumulated group values of said first accumulation with accumulated group values of corresponding groups of neighboring pixels in said second accumulations;

calculating a global change value based on the comparison of the first and second accumulations of group values;

setting a GOP length as a number of frames to be encoded in a group of pictures based on said global change value, including making a choice between increasing, decreasing, and leaving unaltered a current GOP length; and encoding said current image frame as an intra-frame or inter-frame based on said GOP length.

* * * * *